Aug. 29, 1961  E. E. DORKINS  2,997,988
FLUID MOTOR MECHANISM
Original Filed Aug. 3, 1959  3 Sheets-Sheet 3
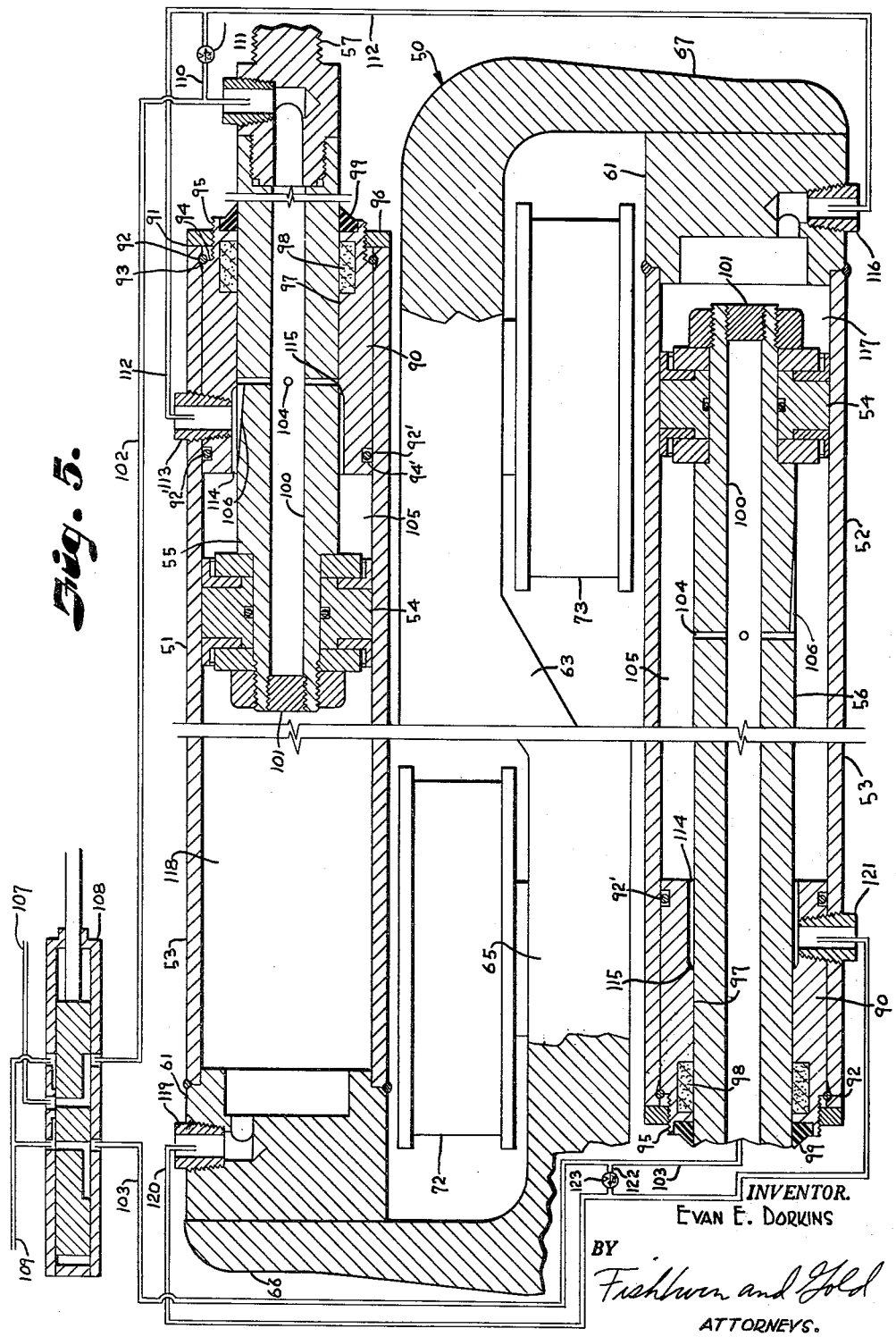
INVENTOR.
Evan E. Dorkins
BY
Fishburn and Gold
ATTORNEYS.

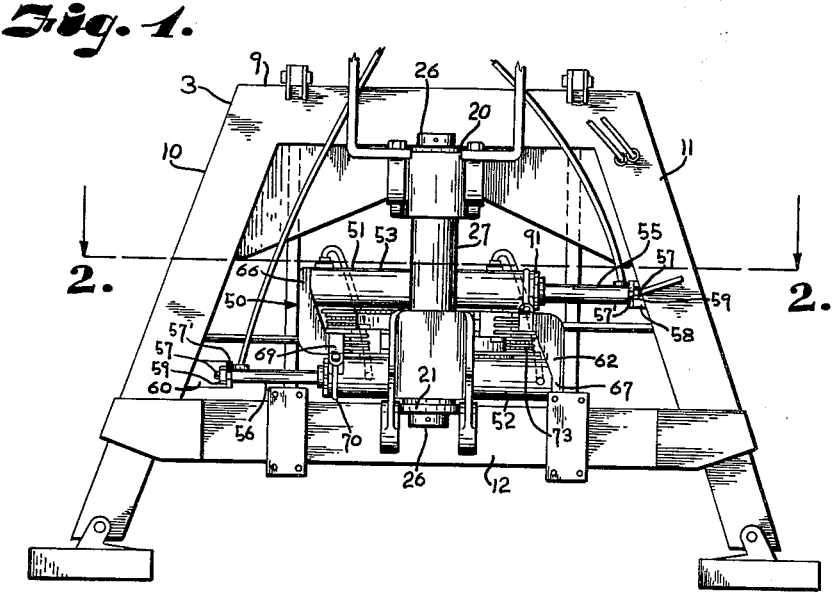

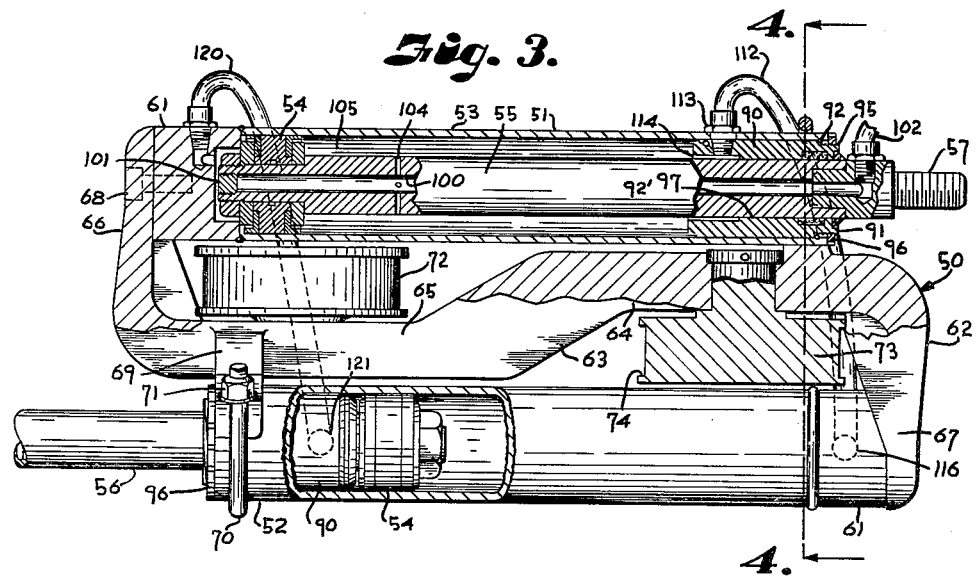
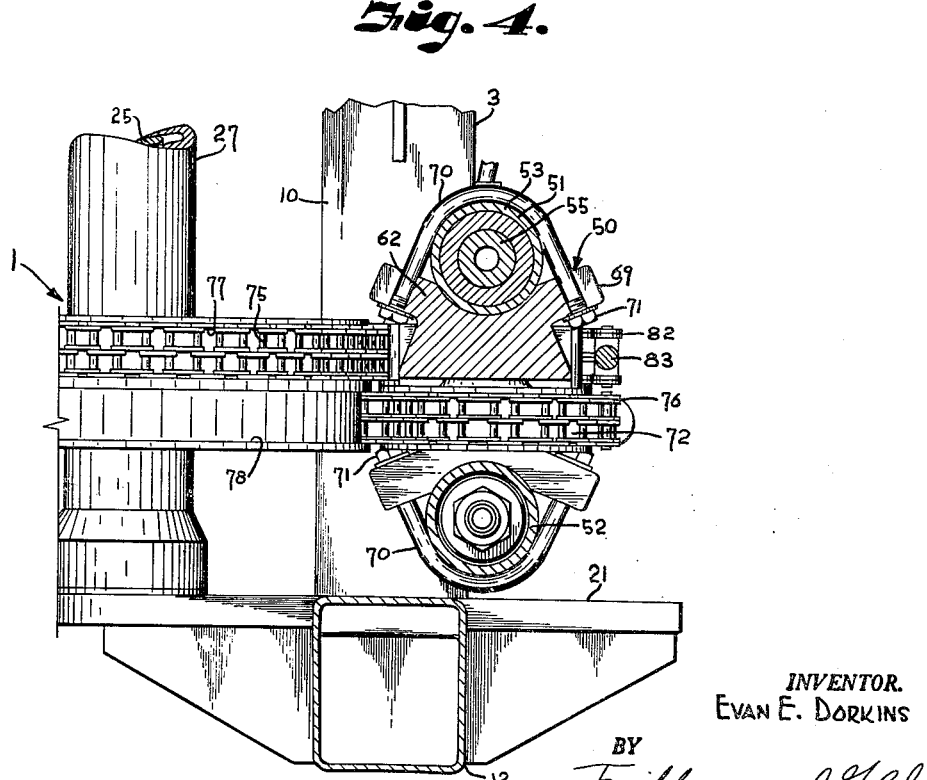

United States Patent Office 2,997,988
Patented Aug. 29, 1961

2,997,988
FLUID MOTOR MECHANISM
Evan E. Dorkins, Ottawa, Kans., assignor to Young Spring & Wire Corporation, Detroit, Mich., a corporation of Michigan
Original application Aug. 3, 1959, Ser. No. 831,285. Divided and this application June 9, 1960, Ser. No. 34,941
4 Claims. (Cl. 121—50)

This invention relates to fluid mechanism, and more particularly to new and improved fluid motor structures for turning or otherwise moving an operable member.

This application is a division of my co-pending application, Serial No. 831,285, filed August 3, 1959.

The principal objects of the present invention are to provide a fluid actuator or motor with cooperating fluid actuated extensible rams connected together and supported to jointly apply moving force to an operable member; to provide such a structure wherein forces and points of application thereof form substantially equalized rotative moments; to provide such a structure with stationary pistons and rods and movable cylinders having fluid passages for hydraulically connecting same; to provide such a structure wherein the hydraulic connections are to points on stationary parts whereby movement of hoses with moving parts is eliminated; to provide such a structure wherein the cylinders and pistons function as a self-contained shock absorber to stop swinging movement adjacent the limits of the boom travel with little shock whereby the boom may be swung at high speeds without damage to the equipment; to provide such an hydraulically operated device with means for cushioning the beginning and ending of the rotative movement thereof; and to provide a fluid motor mechanism and mounting with connections to an operable member that provides ample power, smooth actuation and stopping and that is durable and capable of long, efficient operation with little maintenance.

Other objects and advantages of this invention will become apparent from the following description taken in connection with the accompanying drawings wherein are set forth by way of illustration and example certain embodiments of this invention.

FIG. 1 is an elevational view of the support and movable member thereon operatively connected to a fluid actuator embodying the features of the present invention.

FIG. 2 is a horizontal sectional view through the apparatus on the line 2—2, FIG. 1.

FIG. 3 is an elevational view partly in section of the fluid ram actuator structure.

FIG. 4 is an enlarged vertical sectional view through the structure on the line 4—4, FIG. 3.

FIG. 5 is a schematic view showing the hydraulic system of the hydraulic actuator.

Referring more in detail to the drawings:

1 generally designates an operative member carried on a supporting structure 2 preferably having associated therewith a suitably driven hydraulic pump (not shown) for supplying fluid under pressure to hydraulic equipment, as later described.

In the structure illustrated, an A-frame 3 is connected as at 4 to an adapter frame 5 suitably mounted on the support structure 2. The A-frame has a top member 9 terminating in outwardly and downwardly inclined legs or side members 10 and 11 which are connected at their lower ends by a cross member 12. The A-frame has vertically spaced upper and lower plate-like brackets 20 and 21 respectively extending rearwardly therefrom. The upper bracket 20 is secured to the underside of the top member 9 intermediate the legs 10 and 11. The lower bracket or plate 21 is secured to the upper surface of the cross member 12 intermediate the leg members 10 and 11 and extends forwardly and rearwardly from said cross member. The upper and lower brackets 20 and 21 support a shaft or post 25 which extends vertically and is retained against relative longitudinal movement in the bracket members by collars 26.

The operable member 1 includes a rotating supporting structure such as a mast 27 which is positioned between the brackets 20 and 21 and is mounted on the post 25 whereby said mast 27 rotates about said shaft or post 25. The mast 27 carries a boom or the like 31. A mast rotating mechanism 50 is carried by the A-frame 3 and has connection with the mast for rotating same as may be necessary for desired working positions. The rotating mechanism 50 includes a pair of substantially identical hydraulic rams 51 and 52 arranged in spaced parallel relation and oppositely disposed. The rams each include cylinders 53 with pistons 54 reciprocable therein and having piston rods 55 and 56 of the respective rams 51 and 52 extending from the respective cylinders with the end of the piston rod 55 having a reduced threaded portion 57 extending through a hole 57' in an ear or anchor member 58 fixed on the side member or leg 11 of the A-frame 3. The rod end is secured to said ear 58 by a nut 59 threaded on the threaded portion 57 of said rod. The end of the piston rod 56 is connected in the same manner to an ear or anchor member 60 fixed on the side member or leg 10 of the A-frame 3. In the illustrated structure, the rams 51 and 52 are spaced vertically and positioned in a plane spaced forwardly of the mast 27, said plane being parallel to the axis of rotation of the mast.

The cylinders of each of the rams 51 and 52 have the ends thereof remote from the end from which the piston rods extend closed by heads 61, and said cylinders are secured in rigid relationship to a connector member 62 having a bar portion 63 extending longitudinally between the cylinders with vertically offset arms 64 and 65 extending endwise thereof and terminating in upper and lower brackets 66 and 67 respectively which are secured to the heads 61 by suitable fastening devices such as screws 68. The bracket 66 is secured to the cylinder of the ram 51, and the bracket 67 is secured to the head of the ram 52, the arm 64 being adjacent to the ram 52 and the arm 65 being adjacent to the ram 51, as illustrated in FIG. 3. The respective arms 64 and 65 are secured to the adjacent rams adjacent the ends from which the piston rods extend, said arms each having saddles 69 engaging the cylinder of the respective ram and secured thereto by suitable fastening devices such as U-bolts 70 that extend around the adjacent cylinders with threaded ends extending through ears on the saddles and nuts 71 on said threaded ends to tighten the U-bolts and saddles into clamping relation with the cylinders of the respective rams. With this arrangement, the piston rods and pistons thereon are substantially stationary relative to the A-frame and extension and contraction of the rams effects movement simultaneously of the cylinders longitudinally of said piston rods or toward and away from the respective side members or legs of the A-frame 3.

Guide pulleys 72 and 73 are rotatably mounted on the connector arms 64 and 65 respectively for rotation about spaced vertical axes which are parallel to the axis of rotation of the mast 27. The guide pulley 72 is between the arm 65 and the ram 51, and the pulley 73 is between the arm 64 and the ram 52 whereby said pulleys are positioned at different vertical levels. Each of said pulleys has peripheral grooves 74 or ways therein for guiding flexible members such as chains 75 and 76, as later described. The ways 74 in the pulleys 72 and 73 align with vertically spaced ways 77 and 78 in the periphery of an arcuate member 80 fixed on the mast 27. In the illustrated structure, the arcuate member 80 extends from the mast in the direction opposite from the boom 31 and is preferably substantially semi-circular, as illustrated in FIG. 2. One end of the chain 75 is secured as at 81 to the arcuate member 80 adjacent the end of the upper way 77 at one side of said arcuate member, and extends in said way and then around the guide pulley 72 with the other end 82 of said chain being connected by a rigid member such as a rod 83 which is adjustably connected to an ear or bracket 84 extending forwardly from the A-frame side member 11. One end of the chain 76 is secured as at 85 to the arcuate member adjacent the end of the way 78 therein and on the opposite side of the arcuate member from the end 81 of the chain 75. The chain 76 extends in the way 78 and then around the guide pulley 73 and has the opposite end thereof connected to a rigid member such as a rod 86 which is adjustably connected to a forwardly extending bracket or ear 87 on the A-frame side member 10. The rigid members or rods 83 and 86 have threaded ends with nuts 88 thereon whereby they serve as adjustable connections for the ends of the chain remote from the arcuate member to maintain the chains in taut condition. The connections of the chains with the arcuate member and extent of engagement in the ways thereof are such that some chain is in each way when the mast is swung more than 90-degrees to either side of its center position. With this arrangement, movement of the cylinders of the rams toward the A-frame side member 10 applies force to the chain 75 and rotates the mast and boom to swing the boom toward the A-frame side member 11, and movement of the cylinders of the rams toward the side member 11 applies force to the chain 76 to swing the mast and boom thereon toward the A-frame side member 10. The cylinders and piston rods of the respective rams 51 and 52 are so constructed and connected into an hydraulic system whereby the pressure of the hydraulic fluid is applied to the rams to utilize the power of both simultaneously and in the same direction and apply same to the respective chain providing a pull on the arcuate member for effecting the swinging movement of the boom.

Each of the cylinders of the respective rams has sleeves or glands 90 in the end portions 91 thereof remote from the head 61. Said glands have substantially liquid-tight engagement with the inner surfaces of the cylinders, and are further retained in place by spring metal retainer rings 92 positioned in grooves 93 in the inner cylinder walls and engaging shoulders 94 formed by reduced threaded end portions 95 on which are threaded collars 96 to engage the open ends of the cylinders and draw the shoulders 94 in engagement with the retainer rings 92. Seal rings 92' are positioned in grooves 94' in the glands adjacent the inner ends thereof and have sealing engagement with the inner surface of the cylinders. The glands have bores 97 through which the piston rods are slidably engaged, said glands having packing 98 and resilient seal rings or members 99 engaging the piston rods to form a pressure seal thereagainst.

The piston rods each have longitudinal axial bores or flow passages 100 closed as by plugs 101 at the piston ends and communicating at the other ends with flow lines of the hydraulic system, the piston rod 55 having communicating connection with a flow line 102 and the piston rod 56 having communication with a flow line 103. The piston rods each have lateral bores or ports 104 extending through the walls thereof to communicate the bores or passages 100 with the chambers 105 in the cylinders between the pistons and glands 90, the bores 104 being spaced from the pistons whereby when the cylinders are moved to position the pistons at the end of the stroke adjacent the glands 90, the bores 104 are located in the gland's bore as illustrated in FIG. 5, and in order to provide for small limited flow from the bores 104 to the chambers 105 the piston rods each have a small groove 106 extending from one of the bores 104 therein to the end of the gland toward the pistons on the respective rod.

In the hydraulic system, fluid pressure from a pump (not shown) is applied through a pressure line 107 to a control valve 108 from which a return line 109 provides flow to a reservoir (not shown). When the boom is swung to the limit of its turning toward the A-frame side member 11, and it is desired to swing the boom in the opposite direction, the cylinders and pistons being positioned substantially as shown in FIG. 5, the valve 108 is operated to provide fluid pressure flow from the line 107 to the line 102 whereby fluid under pressure flows to the bore 100 of the piston rod 55 through the bores 104 and groove 106 to the chamber 105, providing for starting movement of the cylinder. Also, the fluid under pressure will flow through a branch line 110 having a check valve 111 therein to a flow line 112 that has one end communicating through a connection 113 in the cylinder of the ram 51, said connection being positioned in the gland 90 adjacent the end thereof toward the respective piston, said gland having a counterbore 114 for flow from the connection into the chamber 105, the counterbore terminating as at 115 in spaced relation to the bore 104 when at the end of the stroke positioning said bore 104 in the gland, as illustrated in the upper portion of FIG. 5. The flow line 112 also has communication through a connection 116 in the head 61 of the ram 52 for flow of fluid to the chamber 117 therein between the piston and head 61. This flow of fluid to both rams applies fluid pressure acting on the cylinders tending to move same on the piston rods toward the A-frame side member 11. During such movement, fluid in the chamber 118 of the ram 51 between the piston and head thereof is forced through a connection 119 to a flow line 120 that provides communication from said chamber 118 to the connection 121 at the gland of the ram 52 whereby said fluid moves through the counterbore 114 into the chamber 105 of the ram 52, but the fluid in that chamber must also be moved therefrom and said fluid flows through the bores or ports 104 into the bore 100 of the piston rod 56 and through the flow line 103 to the valve 108 where it has communication with the return line 109. A branch 122 connects the flow lines 120 and 103 and has a check valve 123 therein permitting flow only from the flow line 103 to the flow line 120. This movement continues until the boom is swung to desired position, and then the valve 108 is actuated to stop all flow through the flow lines 102 and 103 to retain the boom in the selected position. If it is desired to swing the boom to the limit of its rotation toward the side member 10, the valve 108 is continued in or moved to the position to provide fluid pressure to the flow line 102 and the movement of the cylinders continues. However, as it approaches the end of its rotation, the ports 104 in the piston rod 56 enter the counterbore 114 in the ram 52 and pass therebeyond to substantially stop flow from the respective chamber 105 through the ports 104 in the piston rod 56 whereby the fluid trapped in the chamber 118 in the ram 51 and chamber 105 of the ram 52 serves as a cushion stop for the rotative movement of the boom. When it is desired to rotate the boom in the opposite direction, the valve 108 is actuated to provide fluid pressure flow from the pressure line 107 to the flow line 103 and provide communication from the flow line 102 to the line 109, and then the flow is applied to the piston rod of the ram 52 and returns from the piston rod of the ram 51 to move the cylinders in the opposite direction and to apply force to the chain 75 for rotating of the mast and boom.

It is preferable that the relative areas of the bores in the cylinders of the rams 51 and 52 and the areas of the annulus between the piston rods and inner surfaces of said cylinders be proportioned to the distances of the axes of said cylinders to the pulleys 72 and 73 to equalize rotative moments during movements of said cylinders.

When fluid pressure is applied in chamber 118 of ram 51 and annulus chamber 105 in ram 52 to move the cylinders toward the leg 10, the fluid force acting on the cylinder of ram 52 multiplied by the distance of the axis of said cylinder from the center of pulley 72 substantially equals the fluid force acting on the cylinder of ram 51 multiplied by the distance of the axis of said cylinder from said center of pulley 52 due to the pulley 72 being closer to ram 51. The same effective balance of rotative moments is produced when the fluid pressure is changed to move the cylinders toward the leg 11. Also, the wrap around the pulleys 72 and 73 as shown in FIG. 2 is such that tension of the chains acts longitudinally of the cylinders with substantially no lateral forces resulting therefrom. This equalizing of forces and moments provides a structure that is more trouble-free and of longer life than actuators heretofore used.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In an hydraulic actuator comprising, a support, a pair of hydraulic rams each including cylinders with piston rods protruding therefrom, means rigidly connecting the cylinders of said rams one to the other in oppositely disposed relation whereby one piston rod extends from its respective cylinder in one direction and the other piston rod extends in the opposite direction from its respective cylinder, means connecting the protruding ends of said piston rods to said support in fixed spaced relation, said cylinders each having closed ends remote from the ends from which the piston rods protrude, pistons on piston rod ends in the cylinders and reciprocable therein and cooperating with the cylinder ends to define fluid chambers, flow means communicating the chambers in the cylinders at adjacent ends one with the other, a source of fluid pressure, flow means with valves for directing flow of fluid under pressure to the interior of one cylinder between the piston and the end of the cylinder from which the piston rod extends and to the other cylinder chamber adjacent the closed end thereof to simultaneously apply force moving the cylinders on the piston rods in a direction toward the protruding end of the piston rod of said one cylinder, flow lines from the other ends of the cylinders for discharge of fluid from between the pistons and said other ends of the cylinders, and operative means connected to said cylinders for actuation by movement thereof.

2. In an hydraulic actuator comprising, a support, a pair of hydraulic rams each including cylinders with piston rods protruding therefrom, means rigidly connecting the cylinders of said rams one to the other in oppositely disposed relation whereby one piston rod extends from its respective cylinder in one direction and the other piston rod extends in the opposite direction from its respective cylinder, means connecting the protruding ends of said piston rods to said support in fixed spaced relation, said cylinders each having closed ends remote from the ends from which the piston rods protrude, said piston rods having flow passages extending therein and terminating in spaced relation to the piston ends thereof, pistons on said piston rod ends in the cylinders and reciprocable therein and cooperating with the cylinder ends to define fluid chambers, ports in said piston rods communicating the fluid passages in said piston rods with the chambers adjacent the ends from which the piston rods protrude, flow means communicating the chambers in the cylinders at adjacent ends one with the other, a source of fluid pressure, flow means with valves for directing flow of fluid under pressure to the flow passage in one piston rod whereby the fluid is delivered to the interior of the cylinder and to the other cylinder chamber adjacent the closed end thereof to apply force moving the cylinders on the piston rods in a direction toward the protruding end of the piston rod to which the fluid pressure is delivered, flow lines from the other piston rod passage for discharge of fluid from the cylinders at the other ends of said pistons, and operative means connected to said cylinders for actuation by movement thereof.

3. In an hydraulic actuator comprising, a support, a pair of hydraulic rams each including cylinders with piston rods protruding therefrom, means rigidly connecting the cylinders of said rams one to the other in oppositely disposed relation whereby one piston rod extends from its respective cylinder in one direction and the other piston rod extends in the opposite direction from its respective cylinder, means connecting the protruding ends of said piston rods to said support in fixed spaced relation, said cylinders each having closed ends remote from the ends from which the piston rods protrude and having bores at the other ends in which the piston rods are slidably engaged, said piston rods having flow passages extending therein and terminating in spaced relation to the piston ends thereof, pistons on said piston rod ends in the cylinders and reciprocable therein and cooperating with the closed ends and other ends to define fluid chambers, ports in said piston rods in spaced relation to said pistons and communicating the fluid passages in said piston rods with the chambers between the pistons and said other ends, flow means communicating the chambers in the cylinders between the pistons and said other ends of the respective cylinders with the chamber in the other cylinder between the piston and closed end thereof, a source of fluid pressure, flow means with valves for directing flow of fluid under pressure to the flow passage in one piston rod whereby the fluid is delivered to the interior of the cylinder and to the other cylinder chamber adjacent the closed end thereof to apply force moving the cylinders on the piston rods in a direction toward the protruding end of the piston rod to which the fluid pressure is delivered, flow lines from the other piston rod passage for discharge of fluid from the cylinders at the other ends of said pistons, and operative means connected to said cylinders for actuation by movement thereof.

4. In an hydraulic actuator comprising, a support, a pair of hydraulic rams each including cylinders with piston rods protruding therefrom, means rigidly connecting the cylinders of said rams one to the other in oppositely disposed relation whereby one piston rod extends from its respective cylinder in one direction and the other piston rod extends in the opposite direction from its respective cylinder, means connecting the protruding ends of said piston rods to said support in fixed spaced relation whereby by actuation of said cylinders effects simultaneous movement thereof on said piston rods, said cylinders each having closed ends remote from the ends from which the piston rods protrude, an internal sleeve member in the cylinders at the ends from which the piston rods protrude, said sleeves having bores in which the piston rods are slidably engaged, seal means associated with said sleeves for sealingly engaging the piston rods, said piston rods having flow passages extending therein and terminating in spaced relation to the piston ends thereof, pistons on said piston rod ends in the cylinders and reciprocable therein and cooperating with the closed ends and sleeves to define fluid chambers, ports in said piston rods in spaced relation to said pistons and communicating the fluid passages in said piston rods with the chambers between the pistons and sleeves, said ports being positioned whereby they move within the bore of the sleeves when the respective piston is at the end of its stroke adjacent said sleeve, flow means communicating the chambers in the cylinders between the pistons and sleeves of the respective cylinders with the chamber in the other cylinder between the piston and closed end thereof, a source of fluid pressure, flow means with valves for directing flow of fluid under pressure to the flow passage in one piston rod whereby the fluid is delivered to the interior of the cylinder and to the other cylinder chamber adjacent the closed end thereof to apply force moving the cylinders on the piston rods in a direction toward the protruding end of the piston rod to which the fluid pressure is delivered, flow lines from the other piston rod passage for discharge of fluid from the cylinders at the other ends of said pistons until the ports in said other piston rod enter into the respective sleeve bore and substantially stop flow therethrough to trap fluid and serve as a fluid cushion stop to further movement of said cylinders in that direction, and operative means connected to said cylinders for actuation by movement thereof.

References Cited in the file of this patent

UNITED STATES PATENTS

| 966,059 | Sears | Aug. 2, 1910 |
| 1,036,895 | Parsons | Aug. 27, 1912 |
| 2,746,630 | Sinclair | May 22, 1956 |
| 2,880,707 | McCarty | Apr. 7, 1959 |

FOREIGN PATENTS

| 704,454 | Great Britain | Feb. 24, 1954 |